Oct. 12, 1948.  D. K. MACLEOD  2,451,396
METAL DOOR AND PANEL CONSTRUCTION
Filed July 13, 1945

INVENTOR.
DONALD KEITH MACLEOD
BY
Kwis Hudson Boughton & Williams
ATTORNEYS

Patented Oct. 12, 1948

2,451,396

UNITED STATES PATENT OFFICE 2,451,396

METAL DOOR AND PANEL CONSTRUCTION

Donald Keith Macleod, Wooster, Ohio, assignor to United Steel Fabricators, Inc., Wooster, Ohio, a corporation of Ohio Application July 13, 1945, Serial No. 604,739

4 Claims. (Cl. 189—46)

This invention relates to fabricated metal structures such as metal doors, building panels and the like, and aims to provide an improved construction by which greater strength and rigidity can be obtained in fabricated metal structures of this kind.

When a fabricated metal door or the like is subjected to torsional stresses its resistance to such stresses resolves into torsional resistance of that edge or frame portion which is fixed to some permanent mount. If the construction of that particular edge or frame portion lacks the necessary rigidity, the structure will be deflected out of shape by such torsional stresses. The present invention provides a fabricated metal structure for doors and the like which is particularly resistant to such torsional stresses and which is composed of two main members so constructed and connected as to greatly increase or amplify this characteristic of torsional resistance. These main members comprise a marginal metal frame of a substantially U-shaped or channel-shaped hollow cross-section and a panel member having an angular marginal flange. In the completed structure the flange of the panel member closes the open edge of the frame member to convert the latter into a tubular frame member having a cross-section which is continuously closed therearound and which gives the structure the desired high resistance to torsional stresses.

Another object of the present invention is to provide improved construction for metal doors, panels and the like in which the frame of the fabricated structure is hollow and made of sheet metal and in which a flanged metal sheet or panel member is mounted in the frame and is connected therewith so as to render the structure extremely strong and rigid.

A further object of this invention is to provide an improved metal door or panel of this character, in which the flanged metal sheet is a pan-like member having a recess containing a filler of thermo-insulating and sound-deadening material.

The invention can be further briefly summarized as consisting in certain novel structural features and arrangements of parts, hereinafter described and particularly set out in the appended claims.

In the accompanying sheet of drawings.

Figure 1:
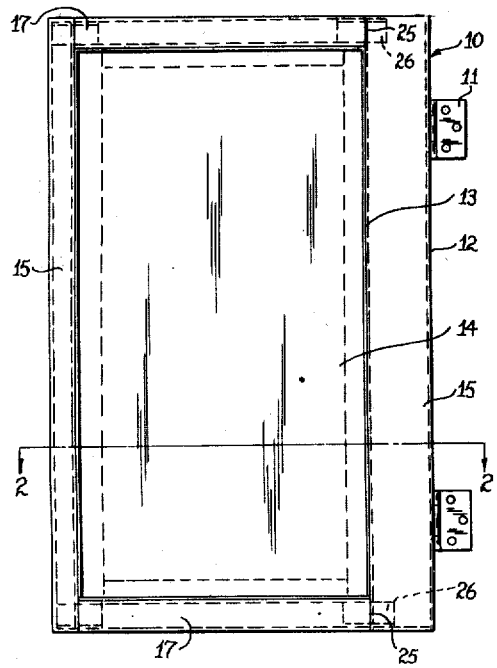
Fig. 1 is a plan or face view of a fabricated metal structure embodying the present invention.
Figure 2:
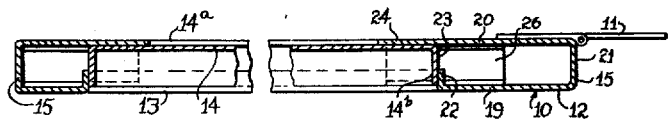
Fig. 2 is a transverse sectional view thereof taken on line 2—2 of Fig. 1.

The present invention is especially applicable to metal doors and panels and to other generally flat fabricated metal structures and when embodied therein greatly increases the strength and rigidity of such structures and their resistance to bending, sagging or twisting. Figs. 1 and 2 show such a generally flat fabricated metal structure 10 in which this invention is embodied. The structure 10 is here shown as being provided with suitable hinges 11 enabling it to be mounted as a swinging door but it will be understood that the hinges 11 can be omitted and that the structure can be used in other ways as a door or closure member and can also be used as a building panel for walls, ceilings, partitions and the like. In this instance, the structure 10 is shown as being of a quadrangular or rectangular shape but it can have any desired shape or outline and can be of any desired size.

As shown in the drawing the structure 10 comprises an outer frame 12 extending around a frame opening 13, and a sheet or panel member 14 mounted in the frame and forming a closure or filler for the opening 13. The frame member 12 and the panel member 14 constitute the two above-mentioned main members of the structure. The frame 12 comprises a pair of substantially parallel side frame members or stiles 15 and a pair of substantially parallel end frame members 17. The side and end frame members 15 and 17 are made of sheet metal and are of a hollow construction as is desirable in structures of this kind. These side and end frame members are disposed in an arrangement so as to form or define the closed or endless outer frame 12. In this instance the side frame members 15 extend for the full length of the structure and the end frame members 17 extend between the side frame members and have their ends suitably connected to the latter. The frame members can all be of the same width or, as shown in the drawing, the frame member to which the hinges 11 are attached can be wider than the others.

The side and end frame members 15 and 17 are of a hollow construction, as mentioned above, and each of these members comprises a pair of substantially flat side faces or wall portions 19 and 20 and a pair of substantially flat outer and inner edges or wall portions 21 and 22. These wall portions 19, 20, 21 and 22 define a channel-shaped cross-section and constitute continuously connected portions of the one-piece metal sheets from which the respective frame members are formed. The wall portions 22 of the frame members, 15 and 17 form a flat inner edge on the frame which extends continuously around the frame opening 13 and is therefore coextensive with and defines the outer edge of this opening.

In the frame construction as illustrated in Fig. 2 the edges or wall portions 22 extend in a direction substantially normal to the general plan of the structure 10 and are of a length, in relation to the thickness of the frame members, such that longitudinal slots or openings 23 are initially left in the inner edges of the frame members. It is not necessary, however, that such slots or openings be left in the frame members and if desired the wall portions 22 can be of a length to provide closed inner edges for the frame members as illustrated in the modified construction of Fig. 6.

Each of the frame members is also provided with a substantially flat longitudinal flange 24 which extends into or toward the frame opening 13 and projects inwardly beyond the flat inner edge or wall portion 22. These inwardly extending flange portions 24 provide the frame 12 with a flange which is substantially continuous around the frame opening 13. The flange portions 24 constitute continuous or integral portions of the metal sheet from which the wall portions 19, 20, 21 and 22 of the frame members are formed. The flanges 24 are preferably formed and located so that they lie in substantially the same plane as the wall portions 20 of the frame members and constitute an inward extension of the latter.

Figure 3:
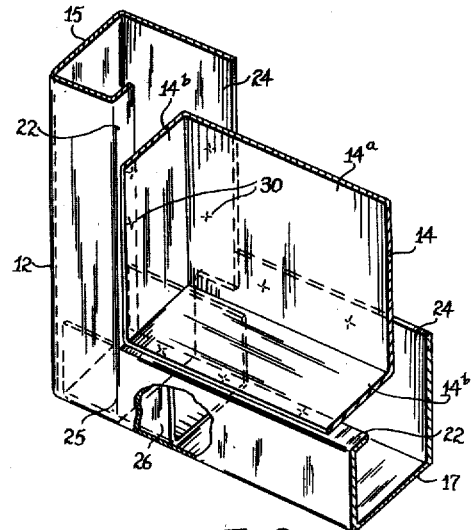
Fig. 3 is a perspective view showing a corner of the fabricated metal structure and further illustrating the connection between the frame members.
Figure 4:
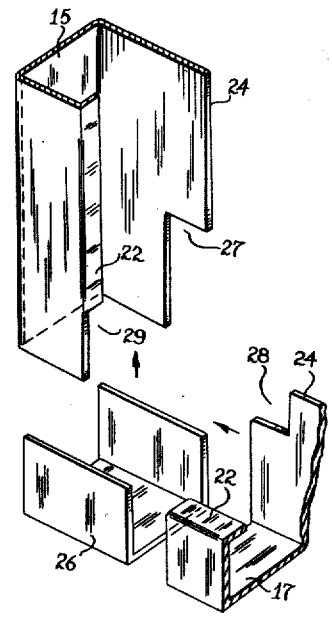
Fig. 4 is a perspective view showing the frame members of Fig. 3 prior to assembly.

The side and end members 15 and 17 of the frame 12 can be connected together in various ways and one satisfactory form of connection is illustrated in Figs. 3 and 4. As shown in these views the end frame members 17 and the side frame members 15 have their cooperating ends so formed or shaped that they can be brought into proper meeting or abutting relation to form a close-fitting joint 25 between these frame members. The joint formed by the cooperating ends of the frame members 15 and 17 preferably also includes a channel-shaped sheet metal insert 26 which, in the assembled construction, extends part way into the ends of both frame members 15 and 17 and spans the joint therebetween. Instead of using the above described insert 26 as a separate piece, the corner connection can be formed by providing the notched end of the member 17 with a reduced or offset integral extension similar to the insert 26 and which is telescoped into the member 15.

As shown in Fig. 4, the flanges 24 of the frame members 15 and 17 are preferably notched out as indicated at 27 and 28 and when these frame members are brought into meeting relation these notched portions interfit in the manner illustrated in Fig. 3. The inner edge or wall portion 22 of the frame member 15 is also notched out as indicated at 29 so as to permit one end of the insert 26 to extend into this frame member. After the ends of the frame members 15 and 17 have been moved into the assembled relation shown in Fig. 3, they are welded or otherwise suitably connected to the insert 26.

An important feature of the present invention is the use of the metal sheet or panel member 14 in the opening of the frame 12 in such a manner as to close or complete the frame 12 and render the structure extremely strong and rigid. The panel member 14 comprises a generally flat metal sheet or web portion 14a having approximately the size and shape of the frame opening 13 and a marginal flange 14b extending completely around the outer edge of the web portion. The flange 14b may be formed integral with the web portion 14a and extends in angular relation to the latter, preferably in a substantially normal or right-angle relation thereto. In this instance, the web portion 14a of the panel member 14 is shown as being flat and imperforate but it is obvious that if desired it can be provided with ribs, louvers, or any other desired elements or configurations of this kind.

When the panel member 14 is assembled into the frame 12 it substantially fills and closes the frame opening 13 with outer edge portions of the web 14a seating against the inwardly extending flange 24 with a face-to-face contact and with the angular marginal flange 14b coextensive with and in face-to-face contact with the flat inner edge or wall portion 22 of the frame. When the frame 12 is constructed with the slot or opening 18 in the inner edge thereof as shown in Fig. 2, the flange 14b of the panel member 14 forms a closure for this slot or opening and thus completes the tubular or hollow cross-sectional shape desired for the frame members. The panel member 14 is connected to the frame 12 by spot welding or otherwise connecting the web portion 14a to the portions of the flange 24 overlapped whereby and also by spot welding or otherwise connecting the angular flange 14b to the inner edge or wall portion 22. It will be understood that these connections occur at spaced points around the frame 12 and in Fig. 3 of the drawings these connections are illustrated as having been formed by spot welding which is indicated at 30.

In a metal door or panel of the construction above described the flanged panel member 14 imparts a desired stiffness and rigidity to the structure such that it will be extremely strong and resistant to twisting, sagging or warping. The increased strength and rigidity thus obtained makes it possible to use a hollow construction for the members of the frame 12 such that these members can be constructed from sheet metal.

Figures 6, 7:
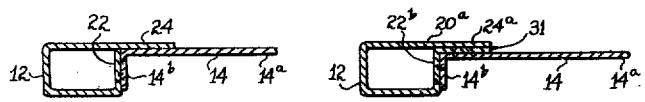
Figs. 6 and 7 are partial transverse sectional views showing other modifications of the fabricated structure.

Fig. 7 shows another modification of the frame of the improved structure in which the wall portion 22b forming the inner edge of the frame members is provided with an inwardly projecting extension or flange 31 which is coextensive with the inwardly extending flange 24a of the side face or wall portion 20a.

Figure 5:
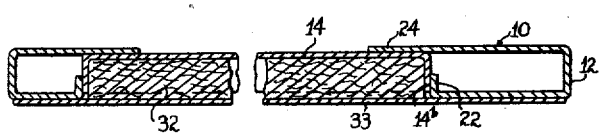
Fig. 5 is a transverse sectional view similar to Fig. 2 but showing a modified construction embodying a filler of insulating and sound-deadening material.

Fig. 5 shows a metal door or panel construction similar to that of Fig. 2 but in which a filler 32 of thermo-insulating and sound-deadening material is located in the pan-like recess of the flanged panel member 14. This insulating material may be any suitable fibrous or cellular material suitable for this purpose such as cork, rock-wool, or cellular cementitious material or a slab or body of fibrous vegetable material. An outer cover sheet or plate 33 extends over and closes the pan-like recess for concealing the filler 32 and retaining the same in the recess. The cover sheet 33 may be attached to the structure 10 by spot welding or otherwise suitably connecting the outer edge portions of the sheet to the frame 12.

From the foregoing description and the accompanying drawing it will now be readily understood that this invention provides an improved fabricated metal structure which is extremely strong and rigid and which can be used as a door or panel or for various other purposes.

While my improved fabricated metal structure has been illustrated and described in some detail, it will be understood, of course, that this invention should not be regarded as correspondingly limited in scope, but includes all changes and modifications coming within the spirit of the invention and the scope of the appended claims.

Having thus described my invention I claim:

1. A metal door comprising, a polygonal sheet metal frame extending around a polygonal frame opening, and a polygonal sheet metal panel disposed in said frame opening, said frame being of a substantially channel-shaped integrally formed cross-section and having spaced flanges extending therealong on the side adjacent the frame opening, one of said flanges projecting laterally toward the frame opening and beyond the other flange and said other flange having an in-turned edge portion extending toward said one flange, said panel having a body portion connected directly to said one flange and also having a marginal flange extending therearound and connected directly to the in-turned edge portion of said other flange.

2. A metal door comprising, a polygonal sheet metal frame extending around a polygonal frame opening, and a polygonal sheet metal panel disposed in said frame opening, said frame being of a substantially channel-shaped integrally formed cross-section and having spaced flanges extending therealong on the side adjacent the frame opening, one of said flanges projecting laterally toward the frame opening and beyond the other flange and said other flange having an in-turned edge portion extending toward said one flange but terminating short of said one flange such that said frame has an initially open slot along the side adjacent said frame opening, said panel having a body portion connected directly to said one flange and also having a marginal flange extending therearound which closes said slot and is connected directly to said in-turned edge portion of said other flange.

3. A metal door comprising, a polygonal frame extending around a polygonal frame opening and formed by side members having their adjacent ends connected together, said side members each comprising a single piece of sheet metal defining a channel-shaped cross-section and having spaced flanges extending therealong on the side adjacent the frame opening, one flange of said side members projecting laterally toward the frame opening and beyond the other flange and said other flange having an in-turned edge portion extending toward said one flange, and a polygonal sheet metal panel disposed in said frame opening, said panel having a body portion connected directly to the laterally projecting flanges of said side members and also having a marginal flange extending therearound and connected directly to the in-turned edge portions of said side members.

4. A metal door comprising, a polygonal sheet metal frame extending around a polygonal frame opening, a polygonal sheet metal panel disposed in said frame opening, said frame being of a substantially channel-shaped integrally formed cross-section and having spaced flanges extending therealong on the side adjacent the frame opening, one of said flanges projecting laterally toward the frame opening and beyond the other flange and said other flange having an in-turned edge portion extending toward said one flange, said panel having a body portion connected directly to said one flange and also having a marginal flange extending therearound and connected directly to the in-turned edge portion of said other flange, and a substantially flat metal cover sheet extending across said frame opening in spaced substantially parallel relation to the body portion of said panel and having its edge portions connected to said frame.

DONALD KEITH MACLEOD.

REFERENCES CITED

The following references are of record in the file of this patent:

UNITED STATES PATENTS

| Number | Name | Date |
| --- | --- | --- |
| 861,572 | Budd | July 30, 1907 |
| 1,262,508 | Kaufman | Apr. 9, 1918 |